US005556565A

United States Patent [19]
Kirkwood et al.

[11] Patent Number: 5,556,565
[45] Date of Patent: Sep. 17, 1996

[54] METHOD FOR COMPOSITE WELDING USING A HYBRID METAL WEBBED COMPOSITE BEAM

[75] Inventors: Brad L. Kirkwood, Kent; Michael M. Stepan, Langley; Paul J. Patt, Bellevue, all of Wash.

[73] Assignee: The Boeing Company, Seattle, Wash.

[21] Appl. No.: 483,407

[22] Filed: Jun. 7, 1995

[51] Int. Cl.⁶ ......................................................... H05B 6/10
[52] U.S. Cl. .......................... 219/633; 219/615; 219/618; 228/157
[58] Field of Search ............................ 219/604, 605–615, 219/633–636, 618; 228/157, 173, 263; 264/257

[56] References Cited

U.S. PATENT DOCUMENTS

| | | |
|---|---|---|
| 2,241,312 | 5/1941 | Luty . |
| 2,273,423 | 2/1942 | Somes . |
| 2,372,920 | 4/1945 | Blessing . |
| 2,378,801 | 6/1945 | Sidell et al. . |
| 2,423,922 | 7/1947 | Arndt, Jr. . |
| 2,589,777 | 3/1952 | Collins . |
| 2,739,829 | 3/1956 | Pedlow et al. . |
| 2,761,941 | 9/1956 | Ardichvili . |
| 2,898,435 | 8/1959 | Crafts . |
| 3,061,503 | 10/1962 | Gould et al. . |
| 3,101,403 | 8/1963 | Lewis et al. . |
| 3,183,460 | 5/1965 | Bennon . |
| 3,288,979 | 11/1986 | Mills et al. . |
| 3,395,261 | 7/1968 | Leatherman et al. . |
| 3,427,421 | 2/1969 | Matheson et al. . |
| 3,431,379 | 4/1969 | Yrene . |
| 3,450,856 | 6/1969 | Buck et al. . |
| 3,492,453 | 1/1970 | Hurst . |
| 3,507,735 | 4/1970 | Chisholm . |
| 3,574,031 | 4/1971 | Heller, Jr. et al. . |
| 3,845,268 | 10/1974 | Sindt . |
| 3,864,186 | 2/1975 | Balla . |
| 3,920,175 | 11/1975 | Hamilton et al. ........................ 228/173 |
| 3,927,817 | 12/1975 | Hamilton et al. ........................ 228/157 |
| 3,941,643 | 3/1976 | Balla . |
| 3,946,349 | 3/1976 | Haldeman, III . |
| 3,996,402 | 12/1976 | Sindt . |
| 4,005,302 | 1/1977 | Graf et al. . . |
| 4,029,837 | 6/1977 | Leatherman . |
| 4,029,926 | 6/1977 | Austin . |
| 4,091,254 | 5/1978 | Struve . |
| 4,117,970 | 10/1978 | Hamilton et al. ...................... 228/173 A |
| 4,120,712 | 10/1978 | Sindt . |
| 4,141,484 | 2/1979 | Hamilton et al. ........................ 228/265 |
| 4,180,717 | 12/1979 | Lenk et al. . |
| 4,288,673 | 9/1981 | Ishibashi . |
| 4,296,295 | 10/1981 | Kiuchi . |
| 4,304,975 | 12/1981 | Lenk et al. . . |
| 4,313,777 | 2/1982 | Buckley et al. . . |
| 4,343,982 | 8/1982 | Schwartz et al. . . |
| 4,355,222 | 10/1982 | Geithman et al. . . |
| 4,382,113 | 5/1983 | Schwartz et al. . . |
| 4,416,713 | 11/1983 | Brooks . |
| 4,421,588 | 12/1983 | Davies . |
| 4,445,951 | 5/1984 | Lind et al. . . |
| 4,521,659 | 6/1985 | Buckley et al. . . |
| 4,622,445 | 11/1986 | Matsen ....................................... 219/633 |
| 4,649,249 | 3/1987 | Odor ........................................ 219/633 |
| 4,653,396 | 3/1987 | Wennerberg . |
| 4,657,717 | 4/1987 | Cattanach et al. ........................ 264/10.2 |
| 4,673,450 | 6/1987 | Burke . |
| 4,768,433 | 9/1988 | Boissevain . |
| 4,791,260 | 12/1988 | Waldman . |

(List continued on next page.)

FOREIGN PATENT DOCUMENTS

| | | |
|---|---|---|
| 0461979 | 4/1984 | European Pat. Off. . |
| 54-25542 | 2/1979 | Japan . |

*Primary Examiner*—Tu Hoang
*Attorney, Agent, or Firm*—John Hammar

[57] ABSTRACT

A hybrid metal webbed composite beam includes a metal I or T web section and a composite cap formed over and adhered to the I or T web. The beam incorporates the advantages of metals and composites in modern aerospace construction allowing thermoplastic welding of the beam to skins while having the strength of metal.

11 Claims, 5 Drawing Sheets

U.S. PATENT DOCUMENTS

| | | | |
|---|---|---|---|
| 4,808,461 | 2/1989 | Boyce et al. | 428/119 |
| 4,822,972 | 4/1989 | Sugioka et al. | |
| 4,897,518 | 1/1990 | Mucha et al. | |
| 4,904,972 | 2/1990 | Mori et al. | |
| 4,919,759 | 4/1990 | Ilmarinen et al. | |
| 4,947,464 | 8/1990 | Mori et al. | |
| 4,978,825 | 12/1990 | Schmidt et al. | |
| 5,001,319 | 3/1991 | Holmstrom. | |
| 5,024,369 | 6/1991 | Froes et al. | 228/157 |
| 5,047,605 | 9/1991 | Ogden. | |
| 5,074,019 | 12/1991 | Link. | |
| 5,079,817 | 1/1992 | Anstotz et al. | |
| 5,101,086 | 3/1992 | Dion et al. | |
| 5,199,791 | 4/1993 | Kasanami et al. | |
| 5,250,776 | 10/1993 | Pfaffmann. | |
| 5,283,409 | 2/1994 | Brendel et al. | |
| 5,313,034 | 5/1994 | Grimm et al. | |
| 5,313,037 | 5/1994 | Hansen et al. | |
| 5,410,132 | 4/1995 | Gregg et al. | 219/604 |
| 5,444,220 | 8/1995 | Hansen et al. | 219/633 |

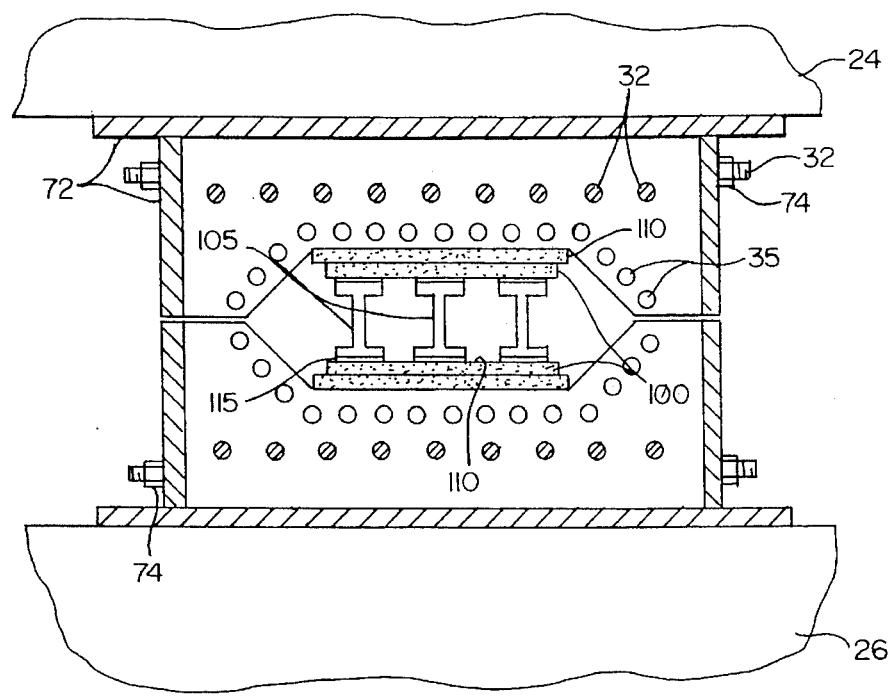
FIG. 6
FIG. 7
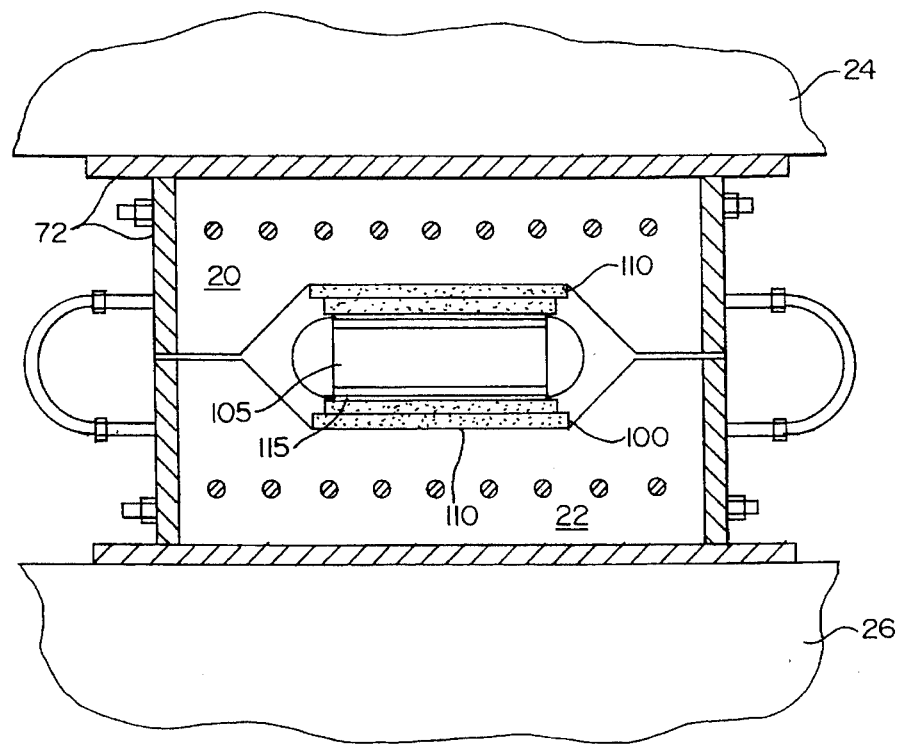

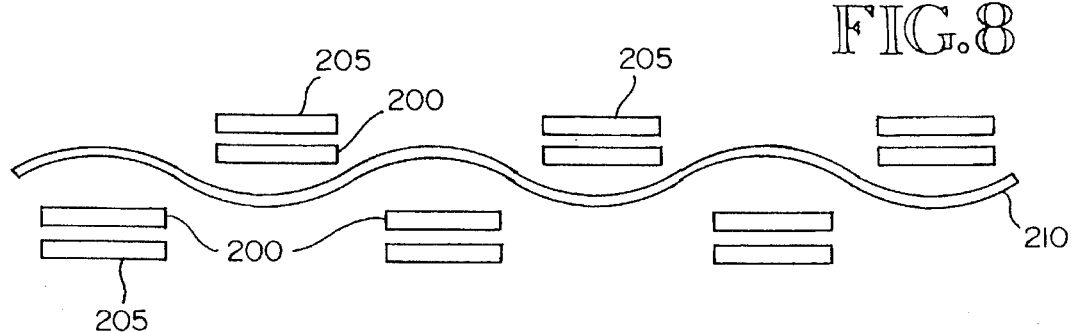
FIG. 8
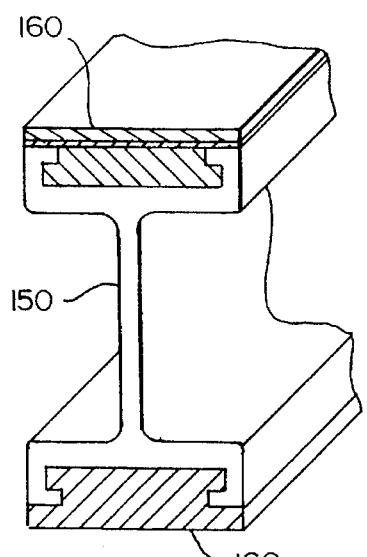
FIG. 9
FIG. 10
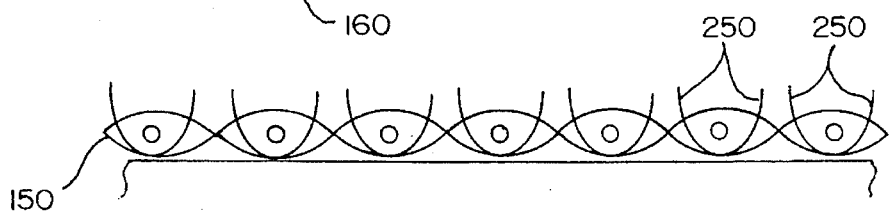
FIG. 11
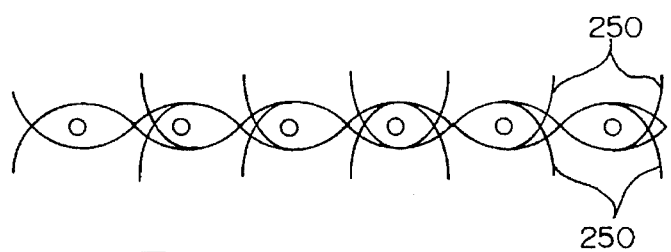
FIG. 12
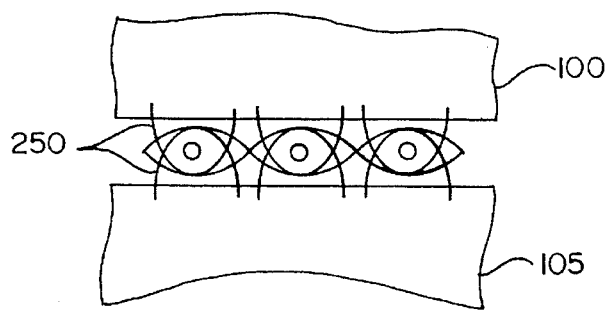

METHOD FOR COMPOSITE WELDING USING A HYBRID METAL WEBBED COMPOSITE BEAM

TECHNICAL FIELD

The present invention relates to a hybrid composite stiffening element, particularly a titanium I or T section web with composite caps that are formed into flanges of the web.

BACKGROUND ART

Aircraft are expensive to manufacture because safety concerns dictate quality manufacture while weight limits range, performance, and payload. There are significant design challenges. Large aircraft are commonly made from aluminum alloys riveted and fastened together. The fasteners add significantly to the total weight. Military aircraft, especially fighters, are more and more being made from thermoset or thermoplastic materials for improved strength-to-weight ratios, but the construction still parrots metal construction with fasteners to join parts into assemblies. Military airplanes must satisfy even more requirements than commercial transport airplanes, such as the Congressionally-imposed "Live Fire" tests. Military airplanes also have unusual performance requirements. To obtain the desired performance, reducing the cost and weight of construction are two enviable objectives.

The present invention is a hybrid beam that combines metal with composites to marry the advantages each offers. This description will first discuss the problems of composite manufacturing before turning to a brief discussion of emerging solutions to address the cost and weight objectives where the beam of the present invention offers the greatest leverage.

1. Composite Manufacturing

Fiber-reinforced organic resin matrix composites have a high strength-to-weight ratio or a high stiffness-to-weight ratio and desirable fatigue characteristics that make them increasingly popular as a replacement for metal in aerospace applications where weight, strength, or fatigue is critical. Organic resin composites, be they thermoplastics or thermosets, are expensive today. Improved manufacturing processes would reduce touch labor and forming time.

Prepregs combine continuous, woven, or chopped reinforcing fibers with an uncured, matrix resin, and usually comprise fiber sheets with a thin film of the resin matrix. Sheets of prepreg generally are placed (laid-up) by hand or with fiber placement machines directly upon a tool or die having a forming surface contoured to the desired shape of the completed part or are laid-up in a flat sheet which is then draped and formed over the tool or die to the contour of the tool. Then the resin in the prepreg lay up is consolidated (i.e. pressed to remove any air, gas, or vapor) and cured (i.e., chemically converted to its final form usually through chain-extension) in a vacuum bag process in an autoclave (i.e., a pressure oven) to complete the part.

The tools or dies for composite processing typically are formed to close dimensional tolerances. They are massive, must be heated along with the workpiece, and must be cooled prior to removing the completed part. The delay caused to heat and to cool the mass of the tools adds substantially to the overall time necessary to fabricate each part. These delays are especially significant when the manufacturing run is low rate where the dies need to be changed frequently, often after producing only a few parts of each kind. An autoclave has similar limitations; it is a batch operation.

In hot press forming, the prepreg is laid-up to create a preform, which is bagged (if necessary), and placed between matched metal tools that include forming surfaces to define the internal, external, or both mold lines of the completed part. The tools and composite preform are placed within a press and then the tools, press, and preform are heated.

The tooling in autoclave or hot press fabrication is a significant heat sink that consumes substantial energy. Furthermore, the tooling takes significant time to heat the composite material to its consolidation temperature and, after curing the composite, to cool to a temperature at which it is safe to remove the finished composite part.

As described in U.S. Pat. No. 4,657,717, a flat composite prepreg panel was sandwiched between two metal sheets made from a superplastically formable alloy and then formed against a die having a surface precisely contoured to the final shape of the part.

Attempts have been made to reduce composite fabrication times by actively cooling the tools after forming the composite part. These attempts have shortened the time necessary to produce a composite part, but the cycle time for and cost of heating and cooling remain significant contributors to overall fabrication costs. Designing and making tools to permit their active cooling increases their cost.

Boeing described a process for organic matrix forming and consolidation using induction heating in U.S. patent application Ser. No. 08/169,655. There, prepregs were laid up in a flat sheet and were sandwiched between aluminum susceptor facesheets. The facesheets were susceptible to heating by induction and formed a retort to enclose the prepreg preform. To ensure an inert atmosphere around the composite during curing and to permit withdrawing volatiles and outgassing from around the composite during the consolidation, we welded the facesheets around their periphery. Such welding unduly impacts the preparation time and the cost for part fabrication. It also ruined the facesheets (i.e., prohibited their reuse which added a significant cost penalty to each part fabricated with this approach). Boeing also described in U.S. patent application Ser. No. 08/341,779 a technique that readily and reliably seals facesheets of the retort without the need for welding and permits reuse of the facesheets in certain circumstances. Our "bag-and-seal" technique applies to both resin composite and metal processing.

2. Processing in an Induction Press

The dies or tooling for induction processing are cast ceramic because a ceramic is not susceptible to induction heating and, preferably, is a thermal insulator (i.e., a relatively poor conductor of heat). Cast ceramic tooling is strengthened and reinforced internally, with fiberglass rods or other appropriate reinforcements and externally with metal or other durable strongbacks to permit it to withstand the temperatures and pressures necessary to form, to consolidate, or otherwise to process the composite materials or metals. Cast ceramic tools cost less to fabricate than metal tools of comparable size and have less thermal mass than metal tooling, because they are unaffected by the induction field. Because the ceramic tooling is not susceptible to induction heating, it is possible to embed induction heating elements in the ceramic tooling and to heat the composite or metal retort without significantly heating the tools. The induction heating elements themselves connect to form a water cooling network. Thus, induction heating can reduce the time required and energy consumed to fabricate a part.

While graphite or boron fibers can be heated directly by induction, most organic matrix composites require a susceptor in or adjacent to the composite material preform to achieve the necessary heating for consolidation or forming. The susceptor is heated inductively and transfers its heat principally through conduction to the preform or workpiece that, in our prior work, is sealed within the susceptor retort. Enclosed in the metal retort, the workpiece does not experience the oscillating magnetic field which instead is absorbed in the retort sheets. Heating is by conduction from the retort to the workpiece.

Induction focuses heating on the retort (and workpiece) and eliminates wasteful, inefficient heat sinks. Because the ceramic tools in our induction heating workcell do not heat to as high a temperature as the metal tooling of conventional, prior an presses, problems caused by different coefficients of thermal expansion between the tools and the workpiece are reduced. Furthermore, we are energy efficient because significantly higher percentages of our input energy go to heating the workpiece than occurs with conventional presses. Our reduced thermal mass and ability to focus the heating energy permits us to change the operating temperature rapidly which improves the products we produce. Finally, our shop environment is not heated as significantly from the radiation of the large thermal mass of a conventional press, and is a safer and more pleasant environment for the press operators.

In induction heating: for consolidating and/or forming organic matrix composite materials, we place a thermoplastic organic matrix composite preform of PEEK or ULTEM, for example, within a metal susceptor envelope (i.e., retort). These thermoplastics have a low concentration of residual volatile solvents and are easy to use. The susceptor facesheets of the retort are inductively heated to heat the preform. We apply consolidation and forming pressure to consolidate and, if applicable, to form the preform at its curing temperature. The sealed susceptor sheets form a pressure zone. We evacuate the pressure zone in the retort in a manner analogous to conventional vacuum bag processes for resin consolidation, or, for low volatiles resins, like ULTEM, we can pressurize this zone to enhance consolidation. The retort is placed in an induction heating press on the forming surfaces of dies having the desired shape of the molded composite part. After the retort (and preform) are inductively heated to the desired elevated temperature, we apply differential pressure (while maintaining the vacuum in the pressure zone around the preform) across the retort which functions as a diaphragm in the press to form the preform against the die into the desired shape of the completed composite panel.

The retort often includes three susceptor sheets sealed around their periphery to define two pressure zones. The first pressure zone surrounds the composite panel/preform or metal workpiece and is evacuated and maintained under vacuum. The second pressure zone is pressurized (i.e., flooded with gas) at the appropriate time and rate to help form the composite panel or workpiece. The shared wall of the three layer sandwich that defines the two pressure zones acts as a diaphragm in this situation.

We can perform a wide range of manufacturing operations in our induction heating press. These operations have optimum operating temperatures ranging from about 350° F. (175° C.) to about 1950° F. (1066° C.). For each operation, we usually need to hold the temperature relatively constant for several minutes to several hours while we complete the operations. While we can achieve temperature control by controlling the input power fed to the induction coil, we have discovered a better and simpler way that capitalizes on the Curie temperature. By judicious selection of the metal or alloy in the retort's susceptor facesheets, we can avoid excessive heating irrespective of the input power. With improved control and improved temperature uniformity in the workpiece, we produce better products. Our method capitalizes on the Curie temperature phenomenon to control the absolute temperature of the workpiece and to obtain substantial thermal uniformity in the workpiece, by matching the Curie temperature of the susceptor to the desired temperature of the induction heating operation being performed. This temperature control method is explained in greater detail in our U.S. patent application Ser. No. 08/469,604 by Hansen et al, entitled Method for Achieving Thermal Uniformity in Induction Processing of Organic Matrix Composites or Metals, which we incorporate by reference.

3. Thermoplastic Welding

Three major joining technologies exist for aerospace composite structure: mechanical fastening; adhesive bonding; and welding. Both mechanical fastening and adhesive bonding are costly, time consuming assembly steps that introduce excess cost even if the parts that are assembled are fabricated from components produced by an emerging, cost efficient process. Mechanical fastening requires expensive hole locating, drilling, shimming, and fastener installation, while adhesive bonding often requires complicated surface pretreatments.

In contrast, composite welding, which eliminates fasteners, features the ability to join thermoplastic are thermoset composite components at high speeds with minimum touch labor and little, if any, pretreatments. In our experience, the welding interlayer (comprising the susceptor and surrounding thermoplastic resin either coating the susceptor or sandwiching it) also can simultaneously take the place of shims required in mechanical fastening. As such, composite welding holds promise to be an affordable joining process. For "welding" thermoplastic and thermoset composite parts together, the resin that the susceptor melts functions as a hot melt adhesive. If fully realized, the thermoplastic-thermoset bonding will further reduce the cost of composite assembly. We use the term "thermoplastic welding" to refer to either bonding operation unless the context forces a different meaning.

There is a large stake in developing a successful induction welding process. Its advantages versus traditional composite joining methods are:

reduced parts count versus fasteners minimal surface preparation, in most cases a simple solvent wipe to remove surface contaminants indefinite shelf life at room temperature short process cycle time, typically measured in minutes enhanced joint performance, especially hot/wet and fatigue permits rapid field repair of composites or other structures.

There is little or no loss of bond strength after prolonged exposure to environmental influences.

U.S. Pat. No. 4,673,450 describes a method to spot weld graphite fiber reinforced PEEK composites using a pair of electrodes. After roughening the surfaces of the prefabricated PEEK composites in the region of the bond, Burke placed a PEEK adhesive ply along the bond line, applied a pressure of about 50–100 psi through the electrodes, and heated the embedded graphite fibers by applying a voltage in the range of 20–40 volts at 30–40 amps for approximately 5–10 seconds with the electrodes. Access to both sides of the assembly is required in this process which limits its application.

Prior art disclosing thermoplastic welding with induction heating is illustrated by U.S. Pat. Nos. 3,966,402 and 4,120,712. In these patents, the metallic susceptors used are of a conventional type having a regular pattern of openings of traditional manufacture. Achieving a uniform, controllable temperature in the bondline, which is crucial to preparing a thermoplastic weld of adequate integrity to permit use of welding in aerospace primary structure, is difficult with those conventional susceptors, as we discussed and illustrated in our copending U.S. patent application Ser. No. 08/068,520.

Thermoplastic welding is a process for forming a fusion bond between two laying thermoplastic faces of two parts. A fusion bond is created when the thermoplastic on the surface of the two thermoplastic composite parts is heated to the melting or softening point and the two surfaces are brought into contact, so that the molten thermoplastic mixes, and the surfaces are held in contact while the thermoplastic cools below the softening temperature.

Simple as the thermoplastic welding process sounds, and easy as it is to perform in the laboratory on small pieces, it becomes difficult to perform reliably and repeatably in a real factory on full-scale parts to build a large structure such as an airplane wing box. The difficulty is in getting the proper amount of heat to the bondline without overheating the entire structure, and also in achieving intimate contact of the faying surfaces of the two parts at the bondline during heating and cooling despite the normal imperfections in the flatness of composite parts, thermal expansion of the thermoplastic during heating to the softening or melting temperature, flow of the thermoplastic out of the bondline under pressure (i.e., squeeze out), and then contraction of the thermoplastic in the bondline during cooling.

The exponential decay of the strength of magnetic fields dictates that, in induction welding processes, the susceptible structure closest to the induction coil will be the hottest, since it experiences the strongest field. Therefore, it is difficult to obtain adequate heating at the bond line between two graphite or carbon fiber reinforced resin matrix composites relying on the susceptibility of the fibers alone as the source of heating in the assembly. For the inner plies to be hot enough to melt the resin, the outer plies closer to the induction coil and in the stronger magnetic field are too hot. The matrix resin in the entire piece of composite melts. The overheating results in porosity in the product, delamination, and, in some case, destruction or denaturing of the resin. To avoid overheating of the outer plies and to insure adequate heating of the inner plies, we use a susceptor of significantly higher conductivity than the fibers to peak the heating selectively at the bondline. An electromagnetic induction coil heats a susceptor to melt and cure a thermoplastic resin (also sometimes referred to as an adhesive) to bond the elements of the assembly together.

The current density in the susceptor may be higher at the edges of the susceptor than in the center because of the nonlinearity of the coil, such as occurs when using a cup core induction coil like that described in U.S. Pat. No. 5,313,037. Overheating the edges of the assembly can result in underheating the center, either condition leading to inferior welds because of non-uniform curing. It is necessary to have an open or mesh pattern in the susceptor embedded at the bondline to allow the resin to create the fusion bond between the composite elements of the assembly when the resin heats and melts.

a. Moving coil welding processes

In U.S. patent application Ser. No. 08/286,360, we described a tailored susceptor for approaching the desired temperature uniformity. This susceptor, designed for use with the cup coil of U.S. Pat. No. 5,313,037, relied upon carefully controlling the geometry of openings in the susceptor (both their orientation and their spacing) to distribute the heat evenly. We suggested using a regular array of anisotropic, diamond shaped openings with a ratio of the length (L) to the width (W) greater than 1 to provide a superior weld by producing a more uniform temperature than obtainable using a susceptor having a similar array, but one where the L/W ratio was one. By changing the length to width ratio (the aspect ratio) of the diamond-shaped openings in the susceptor, we achieved a large difference in the longitudinal and transverse conductivity in the susceptor, and, thereby, tailored the current density within the susceptor. A tailored susceptor having openings with a length (L) to width (W) ratio of 2:1 has a longitudinal conductivity about four times the transverse conductivity. In addition to tailoring the shape of the openings to tailor the susceptor, we altered the current density in regions near the edges by increasing the foil density (i.e., the absolute amount of metal). Increasing the foil density along the edge of the susceptor increases the conductivity along the edge and reduces the current density and the edge heating. We increased foil density by folding the susceptor to form edge strips of double thickness or by compressing openings near the edge of an otherwise uniform susceptor. We found these susceptors difficult to reproduce reliably. Also, their use forced careful placement and alignment to achieve the desired effect.

The tailored susceptor was designed to use with the cup coil of U.S. Pat. No. 5,313,037, where the magnetic field is strongest near the edges because the central pole creates a null at the center. Therefore, the tailored susceptor was designed to counter the higher field at the edges by accommodating the induced current near the edges. The high longitudinal conductivity encouraged induced currents to flow longitudinally.

Our selvaged susceptor for thermoplastic welding which is described in U.S. patent application Ser. No. 08/314,027 controls the current density pattern during eddy current heating by an induction coil to provide substantially uniform heating to a composite assembly and to insure the strength and integrity of the weld in the completed part. This susceptor is particularly desirable for welding ribs between prior welded spars using an asymmetric induction coil (described in U.S. patent application Ser. No. 08/349,647, which we incorporate by reference), because, with that coil, it provides a controllable area of intense, uniform heating, a trailing region with essentially no heating, and a leading region with minor preheating.

The power (P) [or power density] which the susceptor dissipates as heat follows the well-known equation for power loss in a resistor: $P=(J^2)(R)$ wherein J is the eddy current (or its density) and R is the impedance (i.e., resistance) of any segment of the eddy path. The heating achieved directly corresponds to the power (or power density).

We achieve better performance (i.e., more uniform heating) in rib welding by using a selvaged susceptor having edge strips without openings. The resulting susceptor, then, has a center portion with a regular pattern of opening and solid foil edges, which we refer to as selvage edge strips. We embed the susceptor in a thermoplastic resin to make a susceptor/resin tape that is easy to handle and to use in performing the composite pieces prior to welding. Also, we have discovered that, with a selvaged susceptor, the impedance of the central portion should be anisotropic with a lower transverse impedance than the longitudinal impedance. Here, the L/W ratio of diamond shaped openings should be less than or equal to one. That is, unlike our tailored susceptor of U.S. patent application 08/286,360, L for the selvaged susceptor should be less than W. With this new selvaged susceptor in the region immediately under the asymmetric induction work coil, we encourage the current to flow across the susceptor to the edges where the current density is lowest and the conductivity, highest.

Generally, we form the selvaged susceptor somewhat wider than normal so that the selvage edge strips are not in the bondline. We remove the selvage edge strips after forming the weld, leaving only a perforated susceptor foil in the weld. This foil has a relatively high open area fraction.

Significant effort has been expended in developing inductor and susceptor systems to optimize the heating of the bondline in thermoplastic assemblies. Induction coil structures and tailored susceptors have now been developed that provide adequate control and uniformity of heating of the bondline, but a big hurdle remaining to perfecting the process to the point of practical utility for producing large scale aerospace-quality structures in a production environment is the aspect of the process dealing with the control of the surface contact of the faying surfaces of the two parts to be welded together, and the timing, intensity, and schedule of heat application so the material at the faying surfaces is brought to and maintained within the proper temperature range for the requisite amount of time for an adequate bond to form, and is maintained in intimate contact while the melted or softened material hardens in its bonded condition.

Large scale parts such as wing spars and ribs, and the wing skins that are bonded to the spars and ribs, are typically on the order of 20–30 feet long at present, and potentially can be hundreds of feet in length when the process is perfected for commercial transport aircraft. Parts of this magnitude are difficult to produce with perfect flatness. Instead, the typical part will have various combinations of surface deviations from perfect flatness, including large scale waviness in the direction of the major length dimension, twist about the longitudinal axis, dishing or sagging of "I" beam flanges, and small scale surface defects such as asperities and depressions. These irregularities interfere with full surface area contact between the faying surfaces of the two parts and result in surface contact only at a few "high points" across the intended bondline. Additional surface contact can be achieved by applying pressure to the parts to force the faying surfaces into contact, but full intimate contact is difficult or impossible to achieve in this way. Applying heat to the interface by electrically heating the susceptor in connection with pressure on the parts flattens the irregularities, but the time that is needed to achieve full intimate contact with the use of heat and pressure is excessive. The delay need to flatten can result in deformation of the top part. When the overall temperature of the "I" beam flanges reaches the softening point, they will begin to yield or sag under the application of the pressure needed to achieve a good bond.

Our multipass thermoplastic welding process described in U.S. patent application Ser. No. 08/367,546 enables a moving coil welding process to produce continuous or nearly continuous fusion bonds over the full area of the bondline to yield very high strength welds reliably, repeatably and with consistent quality. This process produces improved low cost, high strength composite assemblies of large scale pans fusion bonded together with consistent quality, and uses a schedule of heat application that maintains the overall temperature of the structure within the limit in which it retains its high strength, so it requires no internal tooling to support the structure against sagging which otherwise could occur above the high strength temperature limit. The process also produces nearly complete bondline area fusion on standard production composite material parts having the usual surface imperfections and deviations from perfect flatness, while eliminating fasteners and the expense of drilling holes, inspecting the holes and the fasteners, inspecting the fasteners after installation, sealing between the pans and around the fastener and the holes; reducing mismatch of materials; and eliminating arcing from the fasteners.

In the process, an induction heating work coil is passed multiple times over a bondline while applying pressure in the region of the coil to the components to be welded, and maintaining the pressure until the resin hardens. The resin at the bondline is heated to the softening or melting temperature with each pass of the induction work coil and pressure is exerted to flow the softened/melted resin in the bondline and reduce the thickness of the bondline while improving the intimacy of the faying surface contact with each pass to militate for complete continuity of bond. The total time at the softened or melted condition of the thermoplastic in the faying surfaces is sufficient to attain deep interdiffusion of the polymer chains in the materials of the two faying surfaces throughout the entire length and area of the bondline, thereby producing a bondline of improved strength and integrity in the completed pan, but the total time of the faying surfaces at softened temperature is in separate time segments which allows time for the heat in the interface to dissipate without raising the temperature of the entire structure to the degree at which it loses its strength and begins to sag, so the desired shape and size of the final assembly is maintained.

A structural susceptor allows us to include fiber reinforcement within the weld resin to alleviate residual tensile strain otherwise present in an unreinforced weld. The susceptor includes alternating layers of thin film thermoplastic resin sheets and fiber reinforcement (usually woven fiberglass fiber) sandwiching the conventional metal susceptor that is embedded in the resin. While the number of total plies in this structural susceptor is usually not critical, we prefer to use at least two plies of fiber reinforcement on each side of the susceptor. This structural susceptor is described in greater detail in our U.S. patent application Ser. No. 08/471,625 entitled A Structural Susceptor for Thermoplastic Welding, which we incorporate by reference.

The structural susceptor permits gap filling between the welded composite laminates which tailors the thickness (number of plies) in the structural susceptor to fill the gaps, thereby eliminating costly profilometry of the faying surfaces and the inherent associated problem of resin depletion at the faying surfaces caused by machining the surfaces to have complementary contours. Standard manufacturing tolerances produce gaps as large as 0.120 inch, which is too wide to create a quality weld using the conventional susceptors.

We can easily tailor the thickness of the structural susceptor to match the measured gap by scoring through the appropriate number of plies of resin and fiber reinforcement and peeling them off. In doing so, a resin rich layer will be on both faying surfaces and this layer should insure better performance from the weld.

b: Fixed coil induction welding

We have also experimented with thermoplastic welding using our induction heating workcell and, of course, discovered that the process differs from the moving coil processes because of the coil design and resulting magnetic field. We believe that our fixed coil workcell presents promise for welding at faster cycle times than the moving coil processes because we can heat multiple susceptors simultaneously. The keys to the process, however, are achieving controllable temperatures at the bondline in a reliable and reproducible process that assure quality welds of high bond strength. Our fixed coil induces currents to flow in the susceptor differently from the moving coils and covers a larger area. Nevertheless, we have developed processing parameters that permit welding with our induction heating workcell using a susceptor at the bondline.

To prevent sagging of the prefabricated resin composite parts when the resin melts along the bondline and in the faying surfaces during a thermoplastic welding process, we can use inflatable bladders to fill the hollow spaces in an assembly of the parts to provide a reaction force. We protect the bladder by adding insulation at the interfaces of the parts. The insulation covers sharp edges in the parts and shields the bladder from contact with the hot susceptor that we embed in the bondlines. When we weld, we press a preform assembly of the parts with a die set to have a pressure of about 30–100 psi on each bondline. We inflate the bladder so that the reaction force from the bladder prevents sagging. The typical bladder pressure is about 30–100. Generally, we fill the bladder with air but we might also use a mineral oil or other fluid.

Susceptors along the bondline are problematic, even if we use a reinforced susceptor where the metal foil is woven with the warp threads so that there is a fiber-resin interface rather than a neat metal foil to which the resin does not wet well. We described such a reinforced susceptor in one U.S. patent application Ser. No. 08/469,986 entitled A Reinforced Susceptor for Induction of Thermoplastic Composites, which we incorporate by reference. The problems center on the fact that the metal is a foreign material in the weld or bond present only as a heating source and detriment in other respects. Therefore, welding would be improved if the susceptor could be eliminated.

Sagging is also a problem and countering the sagging is an even bigger problem especially when trying to construct realistic aerospace structural assemblies of ribs, spars, closeouts, and skins. Such assemblies usually include isolated regions where it is difficult to insert or to remove support tooling. Therefore, a design that reduces the possibility of sagging or that inherently includes support tooling would simplify the welding process.

SUMMARY OF THE INVENTION

A hybrid metal webbed composite beam of the present invention preferably includes a titanium sine wave spar web with composite caps that are formed onto flanges of the web. The composite caps are adhered to the titanium web with a hot shoe forming tool to form prefabricated and consolidated thermoplastic composite laminates into a "C" section onto the titanium web or through the lay up, bagging, and consolidation of flexible prepregs onto the titanium flange as an internal tool. The use of the hybrib titanium/composite beam reduces several problems associated with thermoplastic welding of spars and ribs to skins. The titanium I-beam or sinewave provides an internal tool to prevent deformation of the spar caps or delamination of the cap composite plies during the welding process.

The hybrid beam is also superior in performance to an all composite spar, rib, or frame in the following areas: cap pulloff, web blast resistance, bending stiffness, dimensional accuracy, and ability to weld into a composite skinned wing structure. The beam uses both the triaxial strength and fracture resistance of titanium in the web and tee joint areas, and takes advantage of the high specific stiffness of composite materials in the outer chord of the caps. The internal titanium I section functions as an internal tool to allow welding of the thermoplastic caps to thermoplastic skins without additional support tooling.

BRIEF DESCRIPTION OF THE DRAWINGS

FIG. 6 is a schematic cross sectional view of our induction heating workcell adapted for thermoplastic welding of a wingskin/spar assembly.

FIG. 7 is another schematic cross sectional view of the workcell of FIG. 6 rotated 90° from the view in FIG. 6.

FIG. 8 is a schematic cross sectional view of a reinforced susceptor.

FIG. 9 is a schematic sectional view of an alternative beam.

FIG. 10 illustrates schematically in cross section a "smart" susceptor brazed to the spar cap flange to provide improved pulloff strength.

FIG. 11 illustrates schematically in cross section a double-sided "smart" susceptor similar to the susceptor of FIG. 10.

FIG. 12 illustrates schematically in cross section the susceptor of FIG. 11 interfacing at a weld between a composite skin and a composite spar cap.

DETAILED DESCRIPTION OF A PREFERRED EMBODIMENT

1. Our New Hybrid Beam

Figure 1:
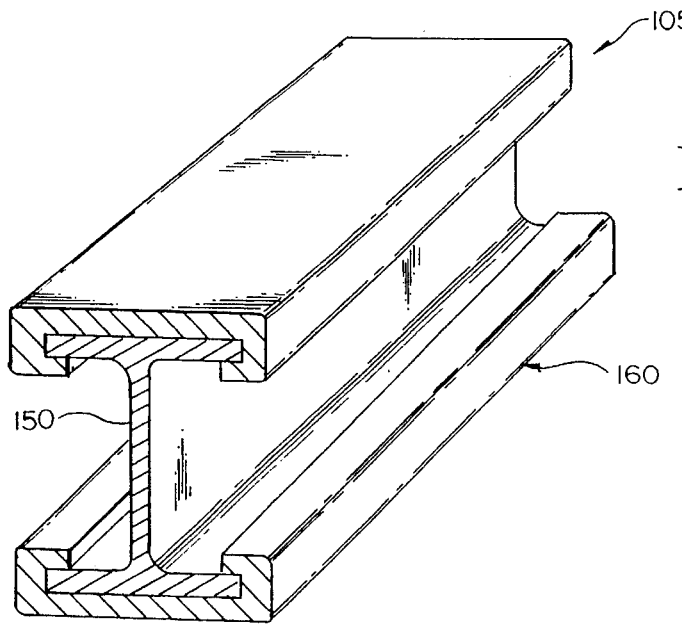
FIG. 1 is a schematic perspective view of our hybrid metal webbed composite beam.
Figure 2:
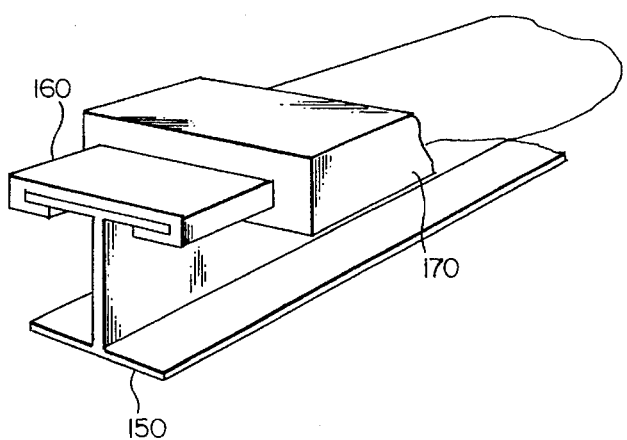
FIG. 2 is a schematic perspective view of forming the beam of FIG. 1 with a hot shoe.

The hybrid beam of the present invention is useful as a spar 105, rib, frame, or beam in high performance military or commercial aircraft. This invention consists of two major components: A superplastically formed and diffusion bonded/brazed titanium I section 150 which forms the web of the spar or frame; and a thermoplastic or thermoset composite (spar or frame) cap 160 which is formed around the Titanium I section and consolidated to it. The titanium web section can either be a straight section or take on a sinusoidal wave pattern. For straight, untapered I sections the use of extrusion directly from titanium billet to near net shape is an attractive process. We can use three manufacturing processes to attach the caps to the titanium webs. In the first process, the caps are formed onto the titanium I section using an automated hot shoe tool that runs down the spar, forming preconsolidated thermoplastic composite laminate into a C section cap as shown in FIG. 2. This invention can also be practiced by hand laying-up a thermoset tape laminate onto the titanium I section as a internal lay-up mandrel tool to produce a hybrid composite spar, frame, or rib as shown on FIG. 3. A thrid process for making the beam involves forming a thermoset or thermoplastic cap on another tool and either slip fitting or attaching the cap to the web followed by co-bonding the assembly in an autoclave or in our induction heating workcell.

Although we can fabricate the cap from either thermoset or thermoplastic materials, we prefer thermoplastic caps because these materials can be hot formed and molded onto the titanium I-section in a rapid, automated process. Another advantage of thermoplastics is their inherent ductility which allows us to produce thicker laminates of uniaxial lay-ups without thermal stress induced microcracking which would affect thermoset composites. The present invention addresses the fundamental problem with the design of T or I section graphite composite spars and frames whose cap pulloff strength is limited by out-of-plane tensile stresses at the cap/web intersection. These out-of-plane stresses are between the gap filler and the composite plies which wrap from the web into the cap and cause failure at this point in a pulloff test. In the conventional all-composite sine wave spar approach, the out-of-plane loading limits the strength of the spar in pulloff to that of the resin which ranges from 18,000 psi for some thermoplastics to roughly 7000 psi for thermosets. These values are quite low relative to that of titanium (120,000 psi yield for Ti-6-4).

The beam also addresses the fundamental weakness of titanium spar or frame designs that have more than adequate cap pulloff strengths, but suffer because titanium has a low specific stiffness relative to composite material and are therefore heavier than composite designs for a given stiffness, even though they are more resistant to damage. Another advantage of this hybrid beam design is the ability to use a majority of uniaxal plies of a thermoplastic composite material in the caps. The shear (±45) plys that are present in traditional composite designs are no longer necessary because the thin titanium web section provides the necessary shear transfer function. Laminates that contain a high percentage of uniaxial plies in their lay-up have up to a factor of three better stiffness in the longitudinal direction than a traditional quasi-isotropic or fabric laminate used in traditional all-composite designs, resulting in a lighter, stiffer spar.

Our beam concept also solves the major difficulty of removing internal tooling from a closed box after welding the spars to the skin. Internal tooling is required when welding all composite spars and ribs to skins to prevent the cap plys from deforming or delaminating when the temperature is above the glass transition temperature. The I-section titanium web of our beam acts to stiffen and support the cap during the induction welding process, so that internal tooling is not required to weld the caps to thermoplastic skins.

The hybrid beam also provides lower total variation of the spar's height as compared to conventional all-composite designs because the total composite laminate thickness on the caps is much thinner than in all-composite designs which must include shear plys that transition into the webs. In addition, the superplastically formed I-sections are more dimensionally accurate after fabrication than the corresponding portion of an all composite spar and can be finish machined for even better accuracy. A large variation in the spar height of about ±50 mils requires extensive and costly shimming or machining of skin pad-ups to make it fit with the mating skin during assembly. When dimensional accuracy is improved to less than ±8 mils (the maximum gap that can be pulled up in assembly of composites) the cost of wing assembly is reduced in traditional assembly processes and greatly improves the thermoplastic welding process.

Boeing made two previous attempts to produce hybrid composite (titanium/graphite composite) laminates. In the first, uniaxial thermoplastic composite material was interleaved with thin cold rolled beta titanium to produce a hybrid titanium/graphite composite. This concept is suitable for use as wing and fuselage skins as part of thin honeycomb sandwich structures, but would not be useful for creating spar, rib or frame I or T section stiffeners or beams. The second attempt was to create a hybrid titanium/graphite composite spar by inserting a titanium T section into a conventional all composite spar design in place of a rolled tape gap filler of a conventional all-composite beam. In this second attempt, the pulloff load of the cap was increased by a factor of 7 from roughly 800 lbs/in to over 5600 lbs/in but the arrangement of the plies, stiffness of the caps and the manufacturing processes to produce this design were the same as those used to fabricate conventional all composite spars. This first hybrid spar design would not be capable of being welded to skins without internal tooling and its shear webs would be more susceptible to hydraulic ram damage in a battle damage event than the beam of the present invention.

The T-section is preferably made by superplastic forming suitable titanium sheet stock with two corresponding "C" elements bonded, welded, fused, brazed or fastened together. Normally the elements are diffusion bonded together after the SPF process is complete, although brazing may be more reliable process as discussed in Boeing's U.S. Pat. No. 5,420,400.

a. Forming the I-beam

Under certain conditions, some materials can be plastically deformed without rupture well beyond their normal limits, a property called superplasticity. This property is exhibited by certain metals and alloys, within limited ranges of temperature and strain rate. For example, titanium and its alloys are superplastic in the temperature range from about 1450°–1850° F. (785°–1010° C.).

Superplastic forming (SPF) is a fabrication technique that relies on superplasticity. A typical SPF process involves placing one or more sheets of metal or plastic in a die, heating the sheets to an elevated temperature within the superplastic range, and superplastically forming the sheet(s) at the SPF temperature. Generally, a differential forming pressure from a gas manifold is used to stretch the sheet(s) into the desired shape against the die surface(s). This forming process can be called blow molding insofar as it uses differential pressure to form the material. The differential pressure is selected to strain the material at a strain rate that is within its superplastic range. The following patents are illustrative of SPF processes and equipment:

| PATENT | TITLE | ISSUE DATE |
| --- | --- | --- |
| 3,920,175 | Method of SPF of Metals with Concurrent Diffusion Bonding | November 18, 1975 |

-continued

| PATENT | TITLE | ISSUE DATE |
| --- | --- | --- |
| 3,927,817 | Method for Making Metallic Sandwich Structures | December 23, 1975 |
| 3,605,477 | Precision Forming of Titanium Alloys and the Like by Use of Induction Heating | September 29, 1971 |
| 4,141,484 | Method of Making a Metallic Structure by Combined Flow Forming and Bonding | February 27, 1979 |
| 4,649,249 | Induction Heating Platen for Hot Metal Working | March 10, 1987 |
| 4,117,970 | Method for Fabrication of Honeycomb Structures | October 3, 1978 |
| 5,024,369 | Method to Produce Superplastically Formed Titanium Alloy Components | June 18, 1991 |

We incorporate these patents by reference.

One advantage of SPF is the forming of complex shapes from sheet metal while reducing the time and eliminating the waste of milling, producing considerable cost saving. In addition, the SPF process is generally applicable to single and multisheet fabrication. For multisheet fabrication, SPF is combined with joining processes, such as diffusion bonding, brazing or laser welding, to produce complex sandwich structures. One advantage of the SPF process is lighter, lower cost parts with fewer fasteners. A single part can replace the complex assembly currently required using conventional manufacturing operations. Common applications of SPF include the manufacture of parts for aircraft, missiles, and spacecraft.

In a typical prior art SPF process for titanium or its alloys, the sheet metal is placed between dies, at least one of which has a contoured surface corresponding to the shape of the product. The dies, are placed on platens which are heated, generally using embedded resistive heaters. The platens heat the dies to about 1650° F. (900° C.). Because the titanium will readily oxidize at the elevated temperature, an inert gas, such as argon, surrounds the die and workpiece. The dies heat the sheet metal to the temperature range where the sheet metal is superplastic. Then, under applied differential pressure, the sheet metal deforms against the contoured surface.

The platens and dies have a large thermal mass. They take considerable time and energy to heat and are slow to change their temperature unless driven with high heat input or with active cooling. To save time and energy, they must be held near the forming temperature throughout a production run (i.e., the production of a number of parts using the same dies). The raw sheet metal must be inserted onto the dies, and formed parts removed, at or near the elevated forming temperature. The hot parts must be handled carefully at this temperature to minimize bending. Within the SPF range, the SPF metals have the consistency of taffy, so bending can easily occur unless the operators take suitable precautions.

As described to some degree in U.S. Pat. No. 4,622,445 and in U.S. Pat. No. 5,410,132, we have discovered an improvement for an SPF process coupling the use of cast ceramic dies with inductive heating. With our inductively heated SPF press or workcell, we can heat preferentially the sheet metal workpiece with induction heating without heating the platens or dies significantly and can use the ceramic dies as an insulator to hold the induced heat in the part. We can stop the heating at any time and can cool the part relatively quickly even before removing it from the die. We do not waste the energy otherwise required to heat the large thermal mass of the platens and dies. We do not force the press operators to work around the hot dies and platens. With our inductive heating workcell, we also save time and energy when changing dies to set up to manufacture different parts because the dies and platen are significantly cooler than those in a conventional SPF press. We shorten the operation to change dies by several hours. Therefore, the induction heating process is an agile work tool for rapid prototyping or low rate production with improved efficiency and versatility.

The web is readily manufactured using conventional SPF processes and generally is shaped to include a transverse sinusoidal waveform shape for increased strength.

We can form the beam from titanium sheet stock using our induction heating workcell or in a conventional SPF press. We can diffusion bond or braze the complementary C sections in the same equipment and we might combine the forming and bonding (and even β-annealing, if desired) operations into a single cycle as described in our U.S. Pat. No. 5,420,400 and U.S. patent application Ser. No. 08/452,216 entitled Combined Heating Cycles to Improve Efficiency in Inductive Heating Operations, which we incorporate by reference.

b. Attaching the composite cap

Figure 3:
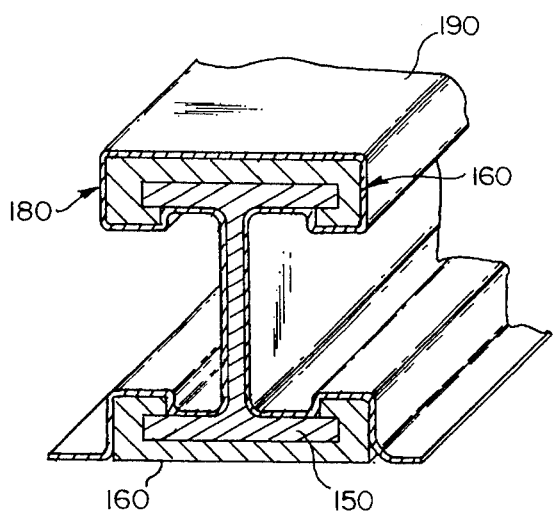
FIG. 3 is a schematic perspective view of forming the beam of FIG. 1 in a lay up and consolidation process.

The spar cap 160 is attached to the web section 150 with the methods shown schematically in FIG. 2 & 3. In FIG. 3, a prefabricated and preconsolidated thermoplastic composite is heated and formed with a hot shoe 170 that passes slowly along the web from end to end. In FIG. 3, the cap 160 is prepared from prepreg that is laid up on the web section 150 in the desired final configuration to surround the T. The lay-up is bagged with a conventional autoclave consolidation film material 180, and the pregreg is consolidated in an autoclave or other suitable process, using a caul plate 190 on the faying surface of the prepreg to obtain a smooth, finished surface and to assure equal pressure over the entire faying surface. Of course, other configurations might be used to attach the cap 160 to the web section 150. For example, the web might include upright tips on the ends of the T to define a shallow channel in which the composite seats. Plies of the prepreg interfere with the lip of the tips. This shallow channel option is illustrated in FIG. 9.

The thermoplastic is typically PEI, PEEK, PEK, PEKK, or polyimide reinforced with glass, carbon, or graphite fibers. The web section is typically an SPF alloy of titanium. The T-section of the web can function as the induction susceptor in the welding operation, if the cap is thin enough to melt at the faying surface when heated from within. Alternatively, a susceptor might be used at the bondline including, if desired, a reinforced susceptor fabric weave as the ply immediately adjacent the faying surface, as described in our U.S. patent application Ser. No. 08/469,986, which we incorporate by reference, and as schematically illustrated in FIG. 8.

The hybrid beam is particularly suitable for use in thermoplastic welding of aerospace wingbox or wing tip structure where ribs and spars are welded to wingskins. We will next discuss our induction heating equipment for performing thermoplastic welding and then will discuss the welding process.

2. The Induction Heating Press

Figure 4:
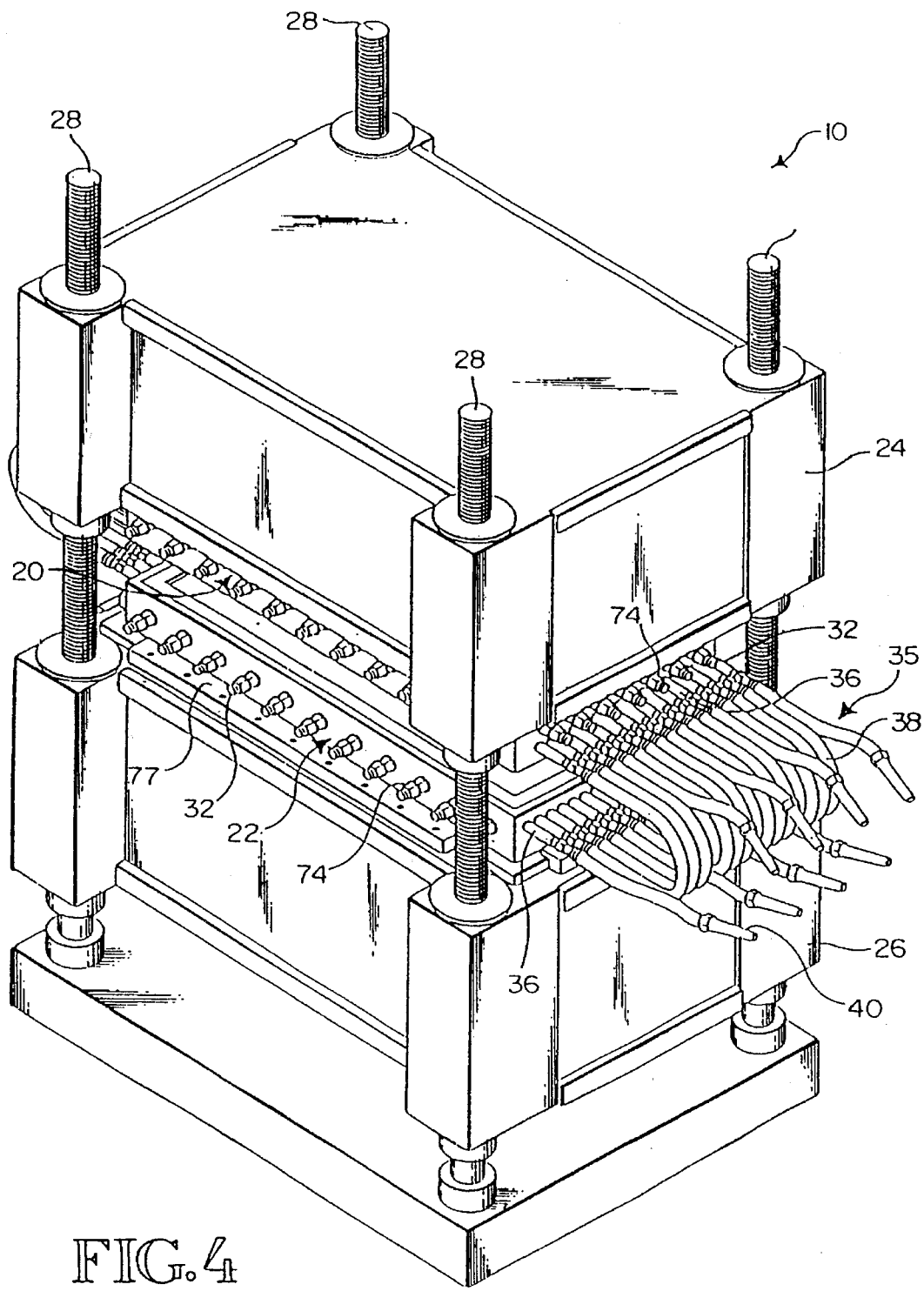
FIG. 4 is a perspective view of our induction heating workcell.

In FIG. 4, an induction heating workcell 10 includes tools or dies 20 and 22 mounted within an upper 24 and a lower 26 strongback. The strongbacks are each threaded onto four threaded column supports or jackscrews 28 or they float free on the columns and are fixed with nuts. We can turn the jackscrews to move one strongback relative to the other. The strongbacks 24 and 26 provide a rigid, flat backing surface for the upper and lower dies 20 and 22 to prevent the dies from bending and cracking during manufacturing operations. Preferably, the strongbacks hold the dies to a surface tolerance of ±0.003 inches per square foot of the forming surface. Such tolerances are desirable to achieve proper pan tolerances. The strongbacks may be steel, aluminum, or any other material capable of handling the loads present during forming or consolidation, but we prefer materials that are nonmagnetic to avoid any distortion to the magnetic field that our induction coils produce. In some circumstances, the dies may be strong enough themselves that strongbacks are unnecessary. The strongbacks transfer pressure input through the columns evenly to the dies.

The dies 20 and 22 are usually cast ceramic and are reinforced with a plurality of fiberglass rods 32 that are held with bolts 74 and that extend both longitudinally and transversely in a grid through each die. Each die usually is framed with phonemic reinforcement 72 as well, to maintain a compressive load on the die. Each die may be attached to its strongback by any suitable fastening device such as bolting or clamping. In the preferred embodiment, both dies are mounted on support plates 76 which are held in place on the respective strongbacks through the use of clamping bars 77. The clamping bars 77 extend around the periphery of the support plates 76 and are bolted to the respective strongbacks through the use of fasteners (not shown).

The dies should not be susceptible to inductive heating so that heating is localized in the retort rather than distributed in the press as well. We prefer a ceramic that has a low coefficient of thermal expansion, good thermal shock resistance, and relatively high compression strength, such as a castable fused silica ceramic.

We embed portions of an induction coil 35 in the dies. In FIG. 4 we show four separate induction segments that overlie the top and bottom of the workpiece, but the number usually is higher, as shown in FIG. 6, and the segments can surround the workpiece on the top, bottom, and all sides.. Each segment is formed from a straight tubing section 36 that extends along the length of each die and a flexible coil connector 38 that joins the straight tubing sections 36 in the upper die 20 to the corresponding straight tubing section in the lower die 22. Connectors 40 located at the ends of the induction coil 35 connect the induction coil 35 to an external power source or coil driver 50 and to a circulation system for cooling fluid. While the tubes are shown as being circular in cross-section, other shapes can be used, such as rectangular channels.

Cavities 42 and 44 in the respective dies hold tool inserts 46 and 48. The upper tool insert 46 in some applications has a contoured forming surface 58 that has a shape corresponding to the desired shape of the outer mold line surface of the completed composite. The lower tool insert determines the inner mold line. The tool inserts also should not be susceptible to inductive heating, preferably being formed of a castable ceramic. In some cases, both the dies and the tool inserts can be made from a matrix resin rather than from a ceramic. Using a resin, however, limits use of the tooling to low temperature operations, such as forming or consolidating certain organic matrix composites. We prefer ceramic tooling which provides the greatest flexibility and versatility for the induction heating workcell.

Figure 5:
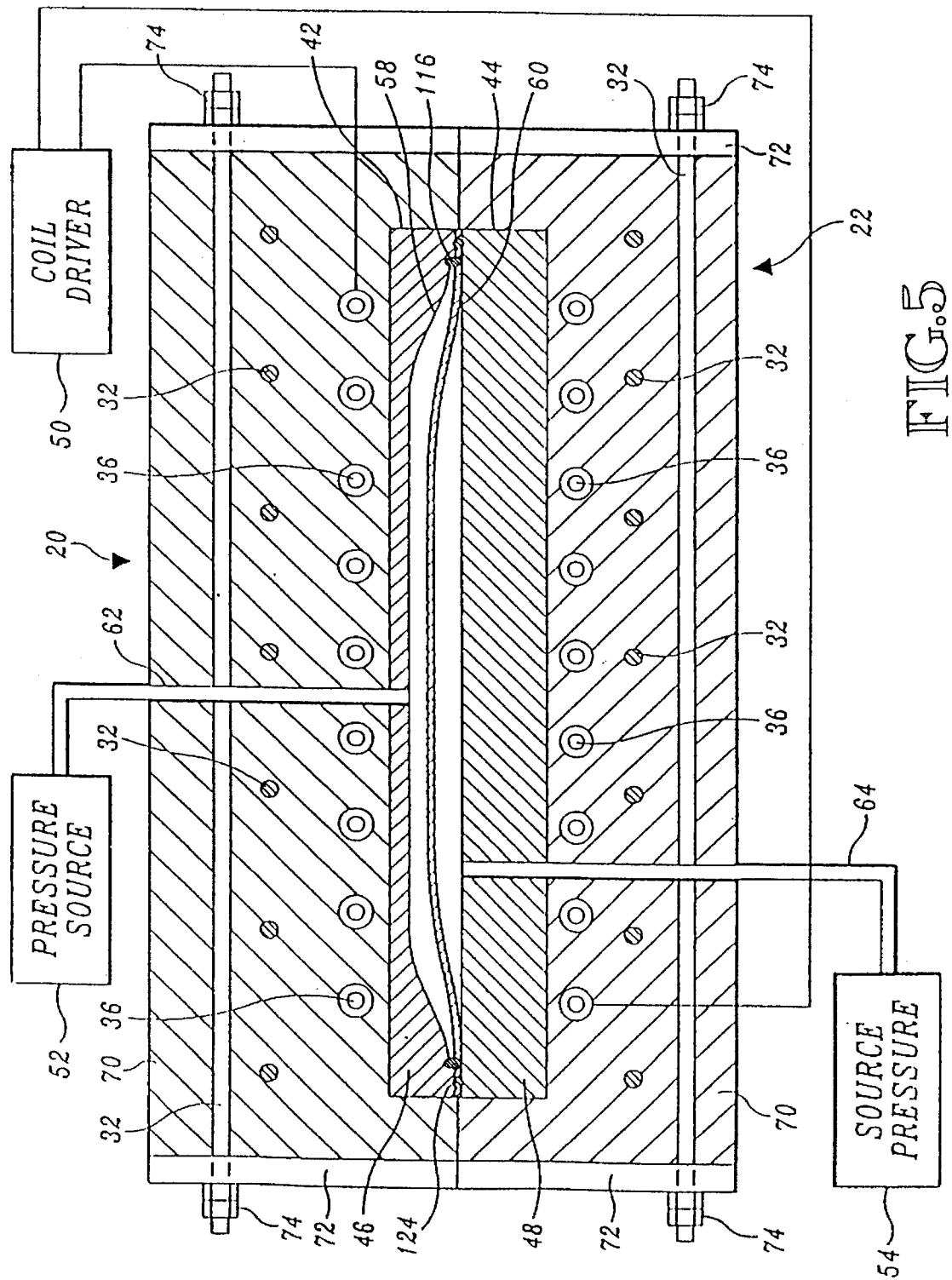
FIG. 5 is a schematic cross sectional view of the induction heating workcell of FIG. 4.

While the forming surfaces can be an integral part of the dies, we prefer the separate die and tool insert configuration shown in FIG. 5 because changing tool inserts to make different pans is easier and quicker (because they are significantly smaller) and the overall tooling costs are reduced.

Each die surrounds and supports the respective tool insert and holds the straight sections 36 of the induction coil in proper position in relationship to the tool insert 46 or 48. In the preferred embodiment, the interior 70 of the dies is formed of a castable phonemic or ceramic and the exterior sides from precast composite phonemic resin blocks 72. In some applications, we prefer to reinforce the phonemic or ceramic with chopped fibers or nonwoven or woven reinforcing mats.

FIG. 5 shows a retort 60 between tool inserts 46 and 48. The retort 60 includes a workpiece and sandwiching susceptor facesheets. The retort is heated to a forming or consolidation temperature by energizing the coil 35. In the case of a composite panel, when the panel reaches the consolidation temperature at which the matrix resin flows, we apply gas pressure to the outer surfaces of the retort by pressure sources 52 and 54. Pressure source 52 applies pressure to the upper surface of the retort 60 through a conduit 62 that passes through the upper die 20 and upper tool insert 46, while pressure source 54 applies a pressure to the lower surface of the retort 60 through a conduit 64 that passes through the lower die 22 and lower tool insert 48. The pressure applied to the retort 60 is maintained until the retort has formed to the contour of the forming surface 58 and the matrix resin has consolidated. The pressure sources 52 and 54 generally apply a differential pressure to the retort 60. We do not use a retort in the present invention.

An alternating oscillating electrical current in the induction coil 35 produces a time varying magnetic field that heats the susceptor sheets of the retort via eddy current heating. The frequency at which the coil driver 50 drives the coils 35 depends upon the nature of the retort 60. We power the coil with up to about 400 kW at frequencies of between about 3–10 kHz. Current penetration of copper at 3 kHz is approximately 0.06 inches (1.5 mm), while penetration at 10 kHz is approximately 0.03 inches (0.75 mm).

The shape of the coil has a significant effect upon the magnetic field uniformity. Field uniformity usually is important because temperature uniformity induced in the retort is directly related to the uniformity of the magnetic field. Uniform heating insures that different portions of the workpiece will reach the operating temperature at approximately the same time. Solenoid type induction coils like those we illustrate provide a uniform magnetic field, and are preferred. Greater field uniformity is produced in a retort that is located symmetrically along the centerline of the surrounding coil. Those of ordinary skill can establish series/parallel induction coil combinations, variable turn spacing, and distances between the pan and the induction coil by standard electrical calculations to achieve the desired heating from whatever coil configuration is used.

The tool inserts and dies are usually substantially thermally insulating and trap and contain heat within the retort. Since the dies and tool inserts are not inductively heated and act as insulators to maintain heat within the retort, the present invention requires far less energy to achieve the desired operating temperature than conventional autoclave or resistive hot press methods where the metal tooling is a massive heat sink.

The operations using our workcell are faster than prior art operations because we do not heat the large thermal mass of either the dies or tool inserts prior to the induction heating process. The susceptor is heated, the tool is not. Thus, the necessary processing temperature is achieved more rapidly.

In addition, the highly conductive materials provide rapid heat transfer to the workpiece. When the driver 50 is de-energized, the dies cool rapidly to a temperature at which we can remove the workpiece from the workcell, saving time and energy over conventional systems. Coolant flowing through the coil tubes functions as an active heat exchanger to transfer heat out of the workpiece, retort, and dies. In addition, the thermal cycle is not as limited by the heating and cooling cycle of the equipment and tools so we can tailor the thermocycle better to the process for which we are using the induction heating workcell.

3. Thermoplastic Welding

As shown in FIGS. 6 & 7, we make several changes to our induction heating workcell to adapt it to perform bondline thermoplastic welding. First, because the assemblies of primary interest are wingskin/spar combinations and because the parts in these combinations are prefabricated so that the welding operation need only focus upon melting the thermoplastic while applying modest pressure to facilitate the fusion, we create a cavity within our dieset to contain the wingskin/spar combinations. The cavity is substantially a cube or similar rectangular solid with canted edges and has major surfaces (i.e., the top and bottom) complementary to the contour of the wing assembly. Our induction coils extend longitudinally in the same direction as the spars and underlie the major and canted surfaces as shown in FIG. 6. The skins 100 and spars 105 are assembled in the center of the cavity sandwiched between silicone rubber pressure pads 110 that assure substantially uniform pressure distribution over the wingskin surfaces irrespective of surface features or irregularities. A susceptor tape 115 usually is positioned along the bondline between the wingskin 100 and the spar caps. By a "susceptor tape" we mean a metal ribbon embedded in thermoplastic resin or a structural susceptor as described in U.S. patent application Ser. No. 08/471,625 having the resin-embedded ribbon sandwiched with alternating plies of thermoplastic film and fiber reinforcement to alleviate residual tensile strain in the weld and to simplify gap filling while ensuring a resin rich, quality weld. The metal ribbon may be copper, a cobalt alloy, nickel-iron alloys, or any other suitable "smart" susceptor from the alternatives discussed in U.S. patent application Ser. No. 08/469,604. The susceptor might be narrow metal strips about 0.10–0.20 in wide held in side-by-side array with the thermoplastic resin or woven with carbon fibers or other reinforcement. The induction coil of our induction heating workcell induces eddy currents that run longitudinally. Therefore, the susceptor should have a lower longitudinal impedance to promote longitudinal current flow. We might use a modified, selvaged susceptor (see U.S. patent application 08/314,027) having solid copper bands alternating with mesh sections with the solid bands in the bondline rather than falling outside it, since they are the primary current carriers.

A "susceptor tape," however, still suffers from a relatively low bond strength because the metal susceptor is asked to function as the equivalent of a reinforcing fiber. The matrix resin, however, does not wet with the metal as well as it does with the reinforcing fibers and the metal does not have the strength commonly available with the fibers. Therefore, a reinforced susceptor promises improved bond strength.

The need for a susceptor in the bondline poses many obstacles to the preparation of quality parts. The metal which is used because of its high susceptibility differs markedly in physical properties from the resin or fiber reinforcement so dealing with it becomes a significant issue.

The reinforced susceptor (FIG. 8) overcomes problems with conventional susceptors by including the delicate metal foils 200 (0.10–0.20 in wide×0.005–0.010 in thick; preferably 0.10×0.007 in) in tandem with the warp fibers 205 of the woven reinforcement fabric. The foil is always on the remote side of the fabric because it is between the warp thread and the weave threads 210. This arrangement holds the foils in place longitudinally in the fabric in electrical isolation from each other yet substantially covering the entire width of the weld surface while still having adequate space for the flow and fusion of the thermoplastic resin. Furthermore, in the bondline, the resin can contact, wet, and bond with the reinforcing fiber rather than being presented with the resinphilic metal of the conventional systems. There will be a resin-fiber interface with only short runs of a resin-metal interface. The short runs are the length of the diameter of two weave fibers plus the spatial gap between the weave fibers, which is quite small. Thus, the metal is shielded within the fabric and a better bond results. In this woven arrangement to foil can assume readily the contour of the reinforcement. Finally, the arrangement permits efficient heat transfer from the foil to the resin in the spatial region where the bond will form. The reinforced susceptor might be an analog of the structural, selvaged, or tailored susceptors of one other application (i.e. a tape encased in resin and placed along the bondline) or may be fabricated as part of the facing flies of the prefabricated composites that abut along the bondline.

As shown in FIG. 7, the susceptors at the bondlines for the top and bottom are connected together into a loop circuit with jumpers 115 at the ends of the spars 105. The jumpers 115 allow the current which the magnetic field induces to flow around the assembly to generate heat in the bondlines.

With the beam of the present invention, the web's spar cap ("flange") functions as an embedded susceptor so it may be unnecessary to use an additional susceptor at the bondline. The flange is oriented properly in the assembly to heat under the time varying magnetic field from the induction coil (moving or fixed). The flange, accordingly can heat the composite cap and with its melting, the cap can create the desired fusion bond or weld.

With the wingskin/spar combination assembled on the pressure pads in the cavity, we close the dies and energize the coil 35 using a frequency of about 3–10 kHz to produce about 400 kw. This energy produces an oscillating magnetic field around the assembly (which preferably is aligned with the central axis of the coil) that rapidly heats the susceptors to the desired welding temperature. If we use a bondline susceptor, we prefer to use a "smart" susceptor made from a nickel-iron alloy as discussed in U.S. patent application Ser. No. 08/469,604 entitled Method for Achieving Thermal Uniformity in Induction Processing of Organic Matrix Composites or Metals, which will assure that we do not overheat the bondline as well as assuring a substantially uniform temperature in the bondline during the fusion period when the thermoplastic resin is melted. As shown in FIG. 6, we simultaneously make the six welds (one weld on each spar cap of the 3 spars), which greatly reduces processing time. The welding process is quite fast taking about 25–30 minutes including heating to the melt, holding the temperature during the weld fusion, and cooling. Throughout the process, we maintain a pressure of about 30–100 psi along the bondline. The weight of the assembly may make the pressure slightly higher on the bottom than the top but this pressure difference should be insignificant to the quality of the weld and the performance of the completed part.

The integrity of the weld is critical to the performance of the completed, welded structure. The quality of the weld is related to the temperature along the bondline and good welds require control of the temperature within a relatively narrow range during the welding. We particularly want to avoid overheating, so a "smart" susceptor made from a Co, Ne, or Fe alloy with a Curie temperature slightly above the melting temperature of the resin will help ensure that we produce quality welds. Furthermore, an alloy like Invar 42 (42% Ni-58% Fe) has a coefficient of thermal expansion (CTE) comparable to the resin composite so that embedding the susceptor into the completed part will not have as dramatic an impact if the susceptor is such an alloy rather than copper or another metal where the CTE mismatch between the resin and susceptor is larger. We might use an Invar cladding (especially age hardened Invar 42) on the titanium spar cap to obtain the "smart" susceptor performance, but worry about mixed metal interfaces in the product. Alternatively, the Invar can be brazed to the spar cap as shown in FIG. 10. The "smart" susceptor includes sharp, barbed prongs 250 (FIG. 10,11,&12) which extend in the Z-direction out of the plane of the susceptor and bondline. These prongs embed in the composite laminate during the welding process to increase significantly the pulloff strength of the weld. The "smart" susceptor is described in our U.S. patent application Ser. No. 08/486,560 entitled Barbed Susceptor for Improving Pulloff Strength of Welded Thermoplastic Composites, which we incorporate by reference. The "smart" susceptor might also be made from martensitic 400 series stainless steel or INCO 909 iconnickel alloy. The prongs 250 generally extend upwardly about 0.020–0.030 in. They are barbed by making slanted laser cuts along their shafts to allow the prongs to penetrate easily but to pull out with difficulty.

The present invention is applicable to all types of organic matrix composites including both thermosetting and the thermoplastic composites such as epoxies, bismaleimides, polyimides, PEEK, PEK, PEKK, PES, or the like. It is especially suited, however, for consolidation or forming of resins that have low volatiles content and that are nonreactive (i.e., the true thermoplastics like PEEK or ULTEM).

The surface of an aircraft wing skin must be maintained to a close tolerance to achieve an efficient aerodynamic surface. The tolerances of the inner mold line surface of the wing skin must also be maintained at a close tolerance at least in a buildup area where the wing skin will be joined to a spar to ensure that the wing skin and spar can be precisely joined. It is not critical, however, to control the inner mold line surface in areas where the wing skin is not attached to other structures. The composite panel has additional plies to define the buildup areas. The additional reinforce the composite panel in these areas which is necessary where a spar will be attached, and provide a convenient way to match the skin and spar to produce the desired outer wing configuration even if the spars are imprecise in their dimensions. We can fabricate built up areas at the faying surfaces to provide the precision fit, in which we can eliminate shims.

In thermoplastic welding, the susceptor may be in sheet, mesh, expanded, milled, selvaged or other suitable form and should be structured from the optimum conductivity longitudinally and transversely needed to obtain controlled, reliable, and reproducible heating. Geometry and structure are closely related to the type of induction head used, as those of ordinary skill will understand. Therefore, the spar caps might include etched, stamped, or machined apertures in a predetermined pattern to produce the desired heating pattern.

If the spar caps of the metal web have a pattern of openings, several other advantages result. First, fusion bonds between the plies overlying the cap and those that bend around can be formed upon curing. Second, Z-pin reinforcement of the nature described in U.S. Pat. No. 4,808,461 can be added to further assist in holding the composite on the metal. During welding, these Z-pins might also help to strengthen the weld bond that forms at the interface between the beam and the skin.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples illustrate the invention and not intended to limit it. Accordingly, limit the claims only as necessary in view of the pertinent prior art.

We claim:

1. A method for joining organic matrix composite materials to form aerospace structure, comprising the steps of:
    (a) assembling a preform to define a bondline, the preform having a prefabricated organic matrix resin composite adjacent a hybrid metal webbed composite capped beam, the beam having a beam web and at least one beam cap, the beam web including a flange for capturing the beam cap and being aligned with the bondline; and
    (b) inducing a current in the flange to heat the bondline sufficiently to join the composite to the beam cap through a resin weld.

2. The method of claim 1 wherein the resin of the organic matrix resin composite is selected from the group consisting of polyimide, PEEK, PEK, PEKK, or PES.

3. The method of claim 1 wherein the flange includes a plurality of prongs in a Z-direction out of the plane of the flange and bondline so that the weld has improved pulloff strength.

4. The method of claim 1 wherein the current is induced using a coil that moves along the bondline.

5. The method of claim 1 wherein the current is induced by placing the preform within a fixed coil and thereafter energizing the coil with a time-varying current to produce a time-varying magnetic field.

6. The method of claim 1 further comprising the step of reinforcing the weld by including at least one reinforcing fiber ply in the weld to reduce residual tensile strain.

7. The method of claim 1 wherein the flange is titanium or a titanium alloy.

8. The method of claim 1 wherein the flange is clad with a susceptable material that has a Curie temperature slightly above the melting temperature of the resin of the organic matrix resin composite.

9. The method of claim 8 wherein the flange includes a plurality of prongs in a Z-direction out of the plane of the flange and bondline so that the weld has improved pulloff strength.

10. The method of claim 1 wherein the flange has a pattern of openings to permit fusion bonding of the composite resin that wraps around the flange.

11. The method of claim 10 further comprising Z-pin reinforcement in the fusion bonding to further assist holding the composite on the flange.

* * * * *